April 26, 1955 A. R. CELLERINI 2,707,218
AIR-BREAK CIRCUIT INTERRUPTERS
Filed May 31, 1951 4 Sheets-Sheet 1
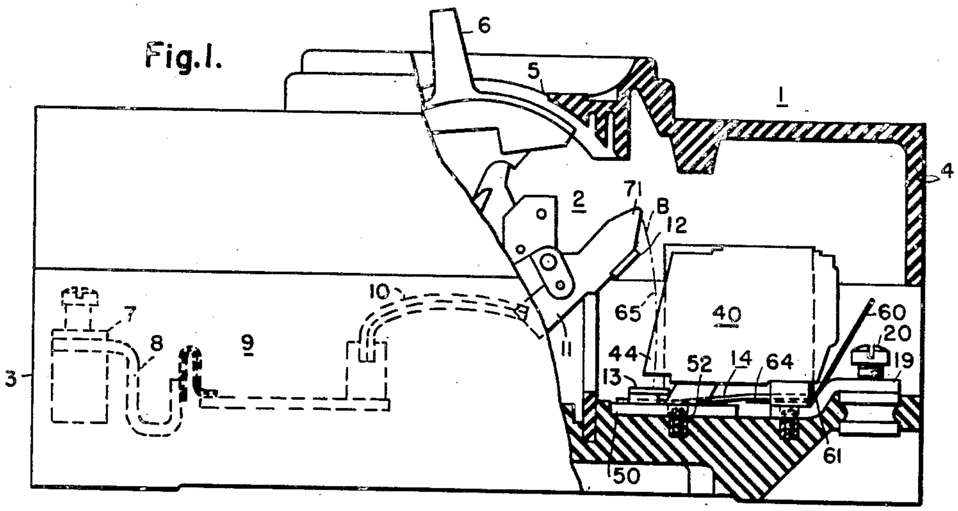
Fig. 1.
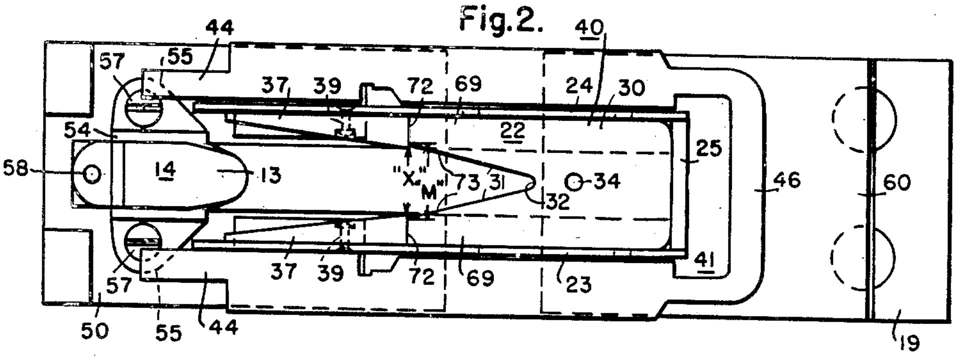
Fig. 2.
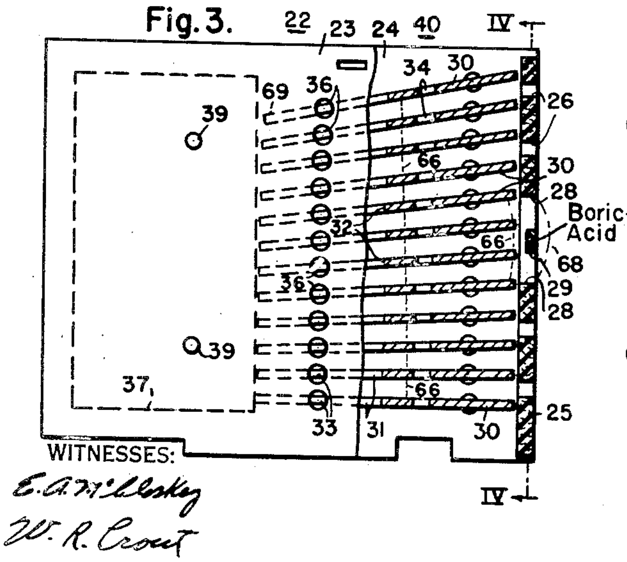
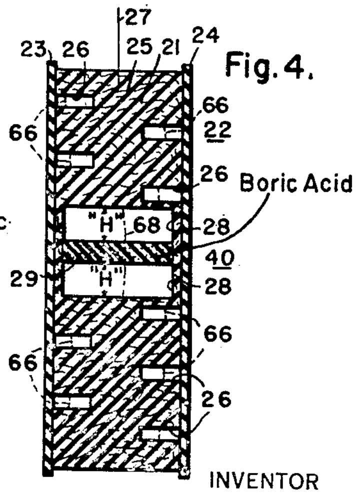
Fig. 3. Fig. 4.
WITNESSES:
E. A. McClosky
W. R. Crout
INVENTOR
Albert R. Cellerini.
BY Ralph H Swingle
ATTORNEY April 26, 1955 A. R. CELLERINI 2,707,218

AIR-BREAK CIRCUIT INTERRUPTERS

Filed May 31, 1951 4 Sheets-Sheet 2

WITNESSES:
E. A. McCloskey.
W. R. Crout

INVENTOR
Albert R. Cellerini.
BY
Ralph H. Swingle
ATTORNEY

WITNESSES:
E. A. McCloskey.
W. R. Crout

INVENTOR
Albert R. Cellerini.
BY
Ralph H. Swingle
ATTORNEY

WITNESSES:
E. A. McCloskey
W. R. Crout

INVENTOR
Albert R. Cellerini.
BY
Ralph H. Swingle
ATTORNEY

United States Patent Office
2,707,218
Patented Apr. 26, 1955

2,707,218

AIR-BREAK CIRCUIT INTERRUPTERS

Albert R. Cellerini, Beaver, Pa., assignor to Westinghouse Electric Corporation, East Pittsburgh, Pa., a corporation of Pennsylvania Application May 31, 1951, Serial No. 229,151

9 Claims. (Cl. 200—144)

This invention relates to circuit interrupters in general, and, more particularly, to arc-extinguishing structures therefor.

A general object of my invention is to provide an improved and more effective arc-extinguishing device for a circuit interrupter, particularly one of the air break type.

A more specific object of my invention is to control and effectively regulate the passage of the terminals of the several arcs between the conducting plates of a circuit interrupter of the air break type.

A further object is to provide a more effective arc-extinguishing device in which the entire length of the device is effectively used to thereby distribute the generated heat throughout the device to facilitate the dissipation of electrical energy.

A further object of my invention is to utilize insulating arc barrier plates in conjunction with the spaced conducting plates so as to bring about a more effective arc-extinguishing device.

A further object of my invention is to provide improved conducting arc-extinguishing plates in a circuit interrupter so that the travel and movement of the established arc portions are more effectively controlled than has been obtained heretofore.

Still a further object of my invention is to provide an improved venting means for a circuit interrupter, particularly one having a plurality of spaced conducting plates between which the arc portions move.

Another object is to utilize gas-evolving material in conjunction with a plurality of spaced conducting plates so that arc extinction is more readily achieved.

Further objects and advantages will readily become apparent upon reading the following specification taken in conjunction with the drawings, in which:

Figure 1 is a side elevational view, partially in section, of a circuit interrupter utilizing my invention and shown in the open circuit position;

Fig. 2 is an enlarged plan view of the arc-extinguishing structure of Fig. 1, the movable contact not being shown;

Fig. 3 is a side elevational view, partially in vertical section, of the arc chute of the interrupter of Figs. 1 and 2;

Fig. 4 is a vertical sectional view taken along the line IV—IV of Fig. 3 looking in the direction of the arrows;

Figure 5:
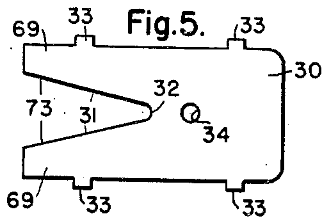
Fig. 5 is a plan view of one of the conducting arc-extinguishing plates utilized in my improved arc-extinguishing device.

Referring to the drawings, and more particularly to Fig. 1 thereof, the reference numeral 1 generally designates a circuit interrupter, particularly one of the air break type. An operating mechanism generally designated by the reference numeral 2, and forming no part of my invention, is positioned within a molded base 3 and enclosed by a molded cover 4, through an opening 5 of which extends an operating handle 6.

The left-hand line terminal 7 may be connected to the external circuit. A conductor 8 electrically connects the line terminal 7 with a thermally responsive tripping device generally designated by the reference numeral 9, and likewise forming no part of my invention. Preferably a flexible lead 10 is electrically connected to the movable contact arm 11, which is actuated by the mechanism 2. The mechanism 2, of course, may be controlled either by manual operation of the externally projecting handle 6, or by actuation of the overload tripping device 9, as well known by those skilled in the art.

Figure 16:
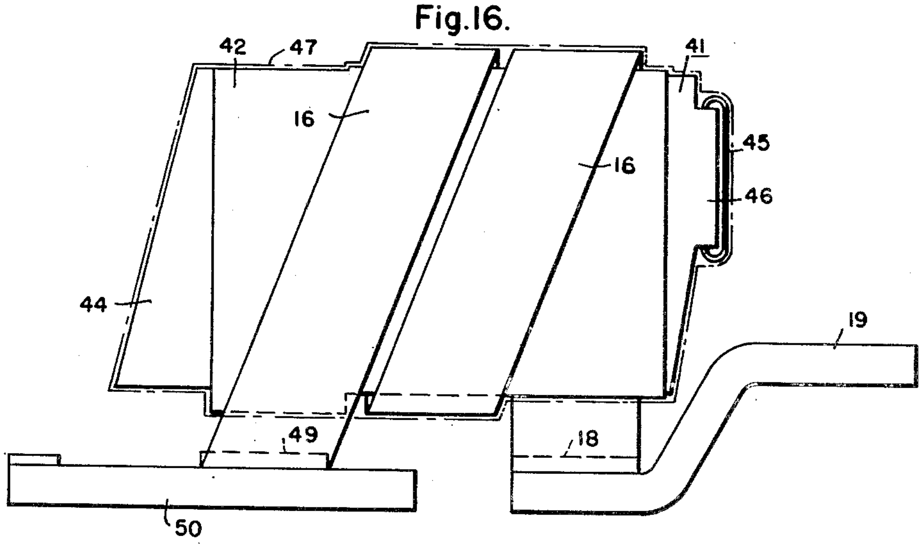
Fig. 16 is a side elevational view of the magnet structure of Fig. 15.
Figure 17:
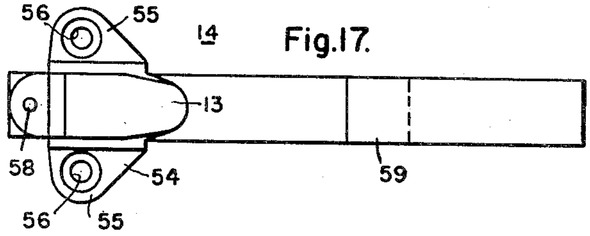
Figs. 17 and 18 illustrate top plan and side elevational views, respectively, of the stationary contact structure of my improved arc-extinguishing device.
Figure 18:
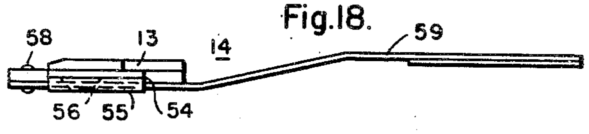

A movable contact 12 is affixed to the extremity of the movable contact arm 11 and cooperates with a stationary contact 13 of a stationary contact structure 14, more clearly shown in Figs. 2, 17 and 18 of the drawings. The circuit then extends from the stationary contact structure 14 through two electrically parallel blowout coils 15 and 16, more clearly shown in Figs. 15 and 16, and connected serially into the circuit. The right-hand ends 17, 18 (Fig. 15) of the blowout coils 15, 16 are connected to a terminal plate 19, to which a line terminal screw 20 may be threadedly connected. The line terminal 20, therefore, is consequently electrically connected into the circuit to be protected.

To extinguish the arc established between the stationary and movable contacts 13, 12 I provide an improved arc chute, generally designated by the reference numeral 22, and more clearly shown in Figs. 2–7 of the drawings.

Referring to these figures it will be observed that two insulating side plates 23, 24 are provided, preferably of fiber sheeting. An end vent plate 25, formed of a suitable insulating material, such as sheet asbestos, is provided suitably affixed between the side plates 23, 24 by any suitable means, such as cementing or the like. It will be observed that the end vent plate 25 has a plurality of vents 26 provided therein staggered about the center line 27, the purpose for which will be more apparent hereinafter.

Between a pair of wider vents 28, the purpose for which will be more apparent hereinafter, is disposed an insulating strip 29 of a suitable gas-evolving material, such as boric acid, horn fiber, or the like. Positioned between the fiber side plates 23, 24, and disposed in spaced relation, are a plurality of slotted conducting plates 30, which are more clearly shown in detail in Fig. 5 of the drawings.

Each conducting plate 30, as mentioned, has a slot 31 extending inwardly and tapering to an apex 32, as shown in Fig. 5. Also each plate 30 has a plurality of holding lugs 33 and an arc deflecting aperture 34. As shown more clearly in Fig. 3, the plurality of spaced conducting plates 30 are mounted between the insulating side plates 23, 24 with the holding lugs 33 extending through apertures 36 provided in the side plates 23, 24. After the positioning of the several arc plates 30 between the side plates 23, 24, the outer ends of the lugs 33 are swaged over to thereby provide a unitary structure.

Figure 6:
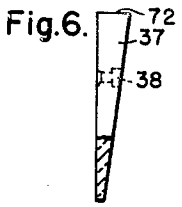
Figs. 6 and 7 are end and side elevational views, respectively, of the insulating arc barriers utilized in my invention.
Figure 7:
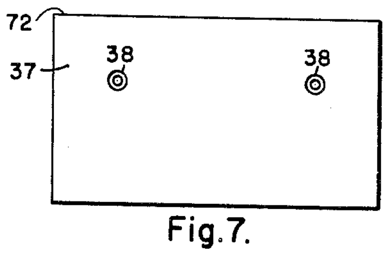

As more clearly shown in Figs. 2 and 3, I provide a pair of insulating arc barrier plates 37 having the configuration more clearly shown in Figs. 6 and 7 of the drawings. Each arc barrier plate 37 has a triangular shape, as shown in Fig. 6. Each barrier plate 37 is preferably formed of a suitable non-gas-evolving material, such as porcelain, asbestos, or the like. Apertures 38 are provided in the barrier plates 37 so that tubular rivets 39 may hold the pair of barrier plates 37 fixedly in place to the inner walls of the side plates 23, 24, as shown in Figs. 2 and 3.

Figure 15:
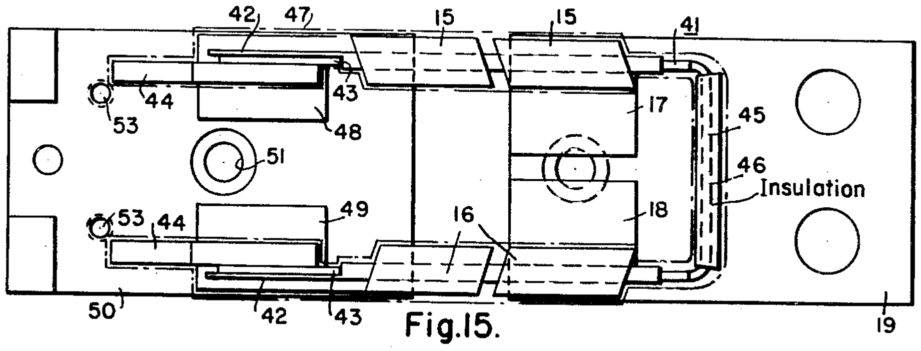
Fig. 15 is a top plan view of the magnet structure for the circuit interrupter of Figs. 1–4.
Figure 19:
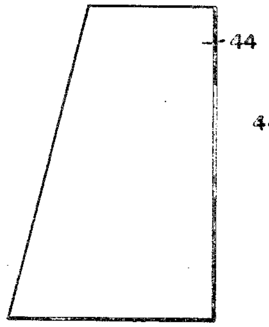
Figs. 19 and 20 illustrate side elevational and end views, respectively, of the magnetic pole plates utilized in the magnet structure of my improved arc-extinguishing device.
Figure 20:
Figure 21:
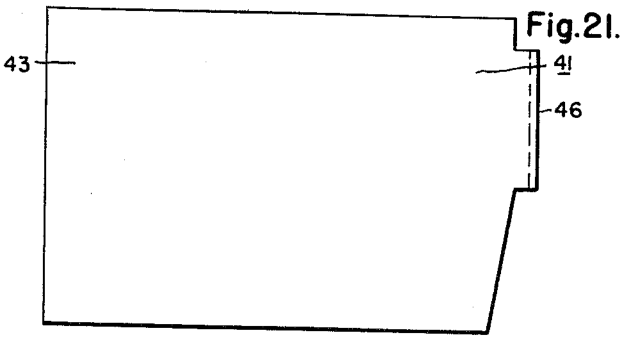
Figs. 21, 22 and 23 illustrate side elevational, end elevational and top plan views, respectively, of the magnet yoke utilized in my improved invention.
Figure 22:
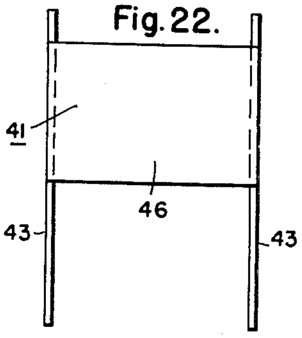
Figure 23:
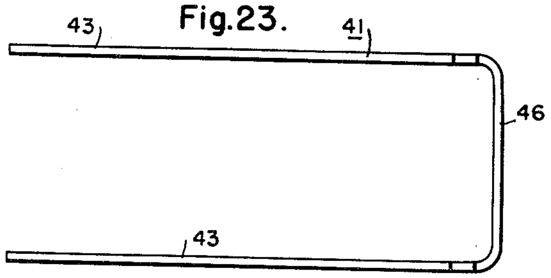
Figures 28, 29:
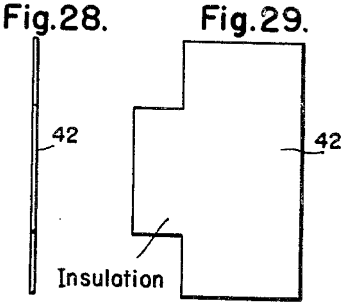
Figs. 28 and 29 illustrate end and plan views, respectively, of an insulating member utilized in my improved arc chute.

The magnet structure for the arc-extinguishing device 40 will now be described. As shown more clearly in Figs. 15 and 16, a magnet yoke 41 (Fig. 21) is encircled by the blowout coils 15, 16 after insulating strips 42 (Fig. 29) have been placed about the pole portions 43. Then a pair of pole plates 44 (Fig. 19) are spot-welded to the inner sides of the pole portions 43 of the magnet yoke 41, as indicated in Figs. 15 and 16. An insulating rectangular strip 45 is wrapped about the bight portion 46 of the magnet yoke 41, following which the entire magnet structure is wrapped with insulating tape and cemented. The outline of the tape, when the magnet yoke is completed, is indicated by the dot-dash lines 47 of Figs. 15 and 16. The ends 48, 49 of the blowout coils 15, 16 are spot-welded to a contact plate 50, which has a mounting aperture 51 provided therein. A screw 52 (Fig. 1) is employed extending through the aperture 51, thereby holding the contact plate 50 fixedly to the base 3 of the circuit interrupter 1. Also a pair of threaded apertures 53 is provided, the purpose for which will be more apparent hereinafter.

Referring to Figs. 17 and 18, it will be observed that the stationary contact 13 consists of a plate which is brazed to a bracket 54 of somewhat yoke-shape. The ends 55 of the yoke bracket 54 have apertures 56 provided therethrough, and screws 57 (Fig. 2) are employed, passing through the apertures 56 of the yoke bracket 54 of stationary contact structure 14 (Fig. 17), and pass into the apertures 53 of the contact plate 50 (Fig. 15), thereby holding the contact structure 14 rigidly in place upon the top of the contact plate 50, as more clearly indicated in Fig. 2 of the drawings.

Figure 24:
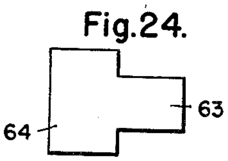
Figs. 24 and 25 illustrate plan and end elevational views, respectively, of an insulating member utilized in my improved arc-extinguishing device.
Figure 25:
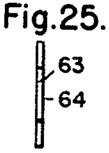
Figure 32:
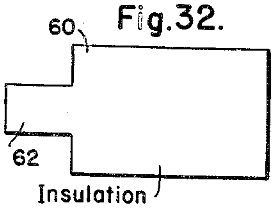

Riveted, as at 58, to the underside of the yoke bracket 54 is a conducting arc runner strip 59, more clearly shown in Figs. 17 and 18. The arc horn 59 provides an electrical connection with the lowermost arc in the arc chute 22 after the established arc has been split up and moves between the several plates 30. Following assembling of the device, an insulating strip 60 (Fig. 32) is bent, as at 61 (Fig. 1), and has its end 62 cemented into place on top of the ends 17, 18 of the blowout coils 15, 16. Placed on top of the end 62 of strip 60 is the end portion 63 of an insulating strip 64 (Fig. 24), as more clearly shown in Fig. 1, the strip 64 being likewise cemented into place. The purpose of the strip 64 is to prevent the right-hand end of the arc runner 59, as viewed in Fig. 17, from contacting the ends 17, 18 of the blowout coils 15, 16, and thereby shorting said coils out of the circuit.

The operation of my improved arc-extinguishing device 40 will now be explained. In the closed position of the interrupter 1, not shown, the electrical circuit therethrough extends from line terminal 7 through the overload device 9, through the flexible strap 10 to the movable contact arm 11. The circuit then extends through the movable contact 12, through stationary contact 13, and through the two blowout coils 15, 16 (in electrical parallel) to the terminal plate 19. The circuit then extends through the line terminal 20.

During the opening operation, either in response to manual operation of the handle 6, or in automatic response to actuation of the overload tripping device 9, the mechanism 2 functions to cause counterclockwise rotative motion of the movable contact arm 11, thereby separating the movable contact 12 upwardly away from the stationary contact 13.

This establishes an arc 65, indicated in Fig. 1, which is affected by the transverse magnetic field extending between the pole plates 44. The magnetic field between the pole plates 44 naturally exists since the blowout coils 15, 16 are constantly energized by the series current and, therefore, constantly set up flux within the magnet yoke 41.

The arc 65 (Fig. 1) moves toward the right, as viewed in Fig. 3, and into the slots 31 of the several spaced plates 30 until it reaches the apices 32, at which time it splits up into a plurality of serially related arc portions 66 (Fig. 3) extending between the plates 30.

The disposition of the arc deflecting apertures 34 in the plates 30 causes the arc portions 66 to stagger, being also assisted by the disposition of the staggered vent openings 26 in the back venting plate 25. Thus the arc portion 66 between an adjacent set of plates 30 will be moved toward its vent opening 26 at the rear end of the arc chute 22, whereas the arc portions 66 of the immediately adjacent sections of the arc will move toward the vent openings 26 disposed on the other side of the center line 27 of the arc chute 22.

From the foregoing it will be apparent that the arc portions 66 become staggered throughout the arc chute 22 and thereby cause a more uniform distribution of the heat losses through the entire conducting plate structure.

Figure 14:
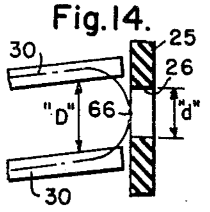
Fig. 14 is an enlarged fragmentary detail view illustrating the principles of my improved venting arrangement.

Referring to Fig. 14, which shows in enlarged fashion the vent opening 26 in the back insulating plate 25 in relation to the distance between adjacent plates 30, it will be noted that the vertical height *d* of each vent opening 26 is less than the vertical height D between adjacent arc plates 30. Thus, although the arc portion 66, as shown in Fig. 14, is moved by the gas blast into the vent opening 26, nevertheless it will not pass through said opening 26 to cause a restrike on the other side of the vent plate 25. By having the vertical height of the vent openings 26 less than the vertical height D between adjacent plates 30, the arc is compelled to stay between the plates 30 and cannot slide out of the opening 26. While it is positioned at this location, it is subjected to a cross-blast of deionized gas, and extinction thereof soon follows.

An important feature of the embodiment of my invention shown in Figs. 1–7 of the drawings is the dispostion of a strip 29 of gas-evolving material, such as boric acid. Moreover, referrring to Fig. 4, it will be observed that the vertical height H of the vent openings 28 adjacent the gas-evolving strip 29 is greater than the distance D (Fig. 14) between the plates 30, so that this encourages the arc portions 66 near the middle of the arc chute 22 to restrike across the right-hand side of the strip 29, as indicated by the reference character 68 (Fig. 3).

The arc portion 68 is thereby intimately in engagement with the gas-evolving strip 29 and intensifies the evolution of gas therefrom. From the foreoing it will be apparent that I have provided an arc chute 22 which uses fiber or boric acid at the back end of the chute to provide a strong concentrated blast of gas against the arc 68. The boric acid strip 29 creates an intensive gas blast at this point in the middle section of the arc chute. By having the vents 28 on either side of this gas-evolving strip 29 wider than the space between the plates 30, the arc sections 66 within the slots 28 can easily slip through their respective openings 28 and restrike as one arc 68, thereby straddling the boric acid section 29. The boric acid or fiber will then direct a blast of gas against the arc 68 in the direction of the breaker vents 26. This blast is generated by the restruck arc 68, and will make the arc very unstable at this point, with the result that its chances of going out at current zero are very much increased. The effect of a boric acid blast on an arc is well known in the circuit breaker and fuse industry, the gas from the boric acid being mostly water vapor, and its deionizing effects are much better than those of fiber gas.

The foregoing construction results in improved venting of the harmful arc gases, a more even distribution of heat over the surfaces of the plates 30, and protection of the arc plate legs 69 (Fig. 5) from wear and tear. It will be observed that the leg portions 69 of the plates 30 are disposed a considerable distance from the stationary contact 13, as shown more clearly in Fig. 2. Thus, the non-gas evolving arc shields 37 are disposed immediately adjacent to the stationary contact structure 14. The plates 30 may be composed of non-magnetic material since blowout coils are used in this embodiment of my invention.

The purpose of the asbestos arc shields 37 is as follows: Being located in the region near the contacts they prevent forming of excessive fiber gas in this region immediately after the arc is drawn. The arc 65 is more effectively propelled toward the back of the arc chute 22 because it cannot linger at the legs of the slots of the plates, as it does in conventional spaced conducting plate structures, since the non-gas-evolving arc shields 37 are disposed at the positions normally occupied by such legs in conventional structures. The shields 37 are, of course, non-conductive, and, together with the slots 31 in the plates 30 form a somewhat continuous, sharp, tapering slot which offers no resistance to arc movement.

Since the arc 65 cannot strike and linger at the legs of the plates, the plates are saved from excessive wear at these points. Also since the arc does not linger at the legs of the plates, the contacts are subject to less heating and melting than is usually the case with long metal plates, normally used. The shields 37 present somewhat of a barrier to gases which are formed at the back of the chute when these gases shoot back towards the contacts. Thus, very little gas returns to invade the contact area.

As shown in Figs. 3 and 4, the vents 26 are staggered for successive spaces. The arrangement provides a solid barrier 21 (Fig. 4) down the center of the back venting plate 25, and staggered vents 26 on each side. This type of arc chute was tested repeatedly with a blowout coil on a 575 volt D. C. inductive circuit. Examination of the arc chute 22 revealed the fact that the arcs 66 split up and dispose themselves inside the chute, as shown by the arrows 70 in Fig. 30.

The deflecting hole 34 provided in each arc plate 30, as shown more clearly in Fig. 5, deflects the arc 66 to one side or the other, towards the vents 26, thereby causing the arc 66 to take a longer circuitous path with resultant even distribution of heat over the surfaces of the plates 30. Each successive arc 66 travels to the opposite side of the plates 30 towards its respective vent 26. Looking from the back of the arc chute 22, the arcs 66 and the current paths through the plates 30 are very clearly shown by the arrows 70 of Fig. 30.

The foregoing statements are based upon examination of traces left upon the plates 30 by the arcs 66, indicating that they occur as stated. The gases exhaust through the back vents 26, and it is reasonable to suppose that the moving gases influence the path and direction taken by the arcs 66.

Fig. 14 shows that the width of the venting slot 26 is smaller than the spaces between the plates. This restricted vent 26 prevents the arc 66 from sliding out of the vent and restriking to the next vent below. The arc 66 is probably bent, as shown in Fig. 14, by the arc gases, but the sharp edges of the top and bottom sides of the vents 26 keep it from escaping. The arc chutes 22 showed no evidence at all of restrikes at the back. Another function of the asbestos barrier plates 37 is that ordinarily the arc 65 would leave the movable contact arm at point B in Fig. 1 and bow outwards down through the arc chute 22 and enter the plates 30 about half way down the arc chute 22. As a result of this usual phenomena in conventional structures, only the bottom half of the arc chute 22 would be effective in splitting up the arc 65 with much more burning in this part of the arc chute 22.

With asbestos side plates 37, the arc 65 is prevented from finding an easy path at point B, and the arc leaves the arc horn 71 at its tip, as shown in Fig. 1, and strikes the top plate 30 of the arc chute 22. Thus, the top plate 30 serves as a top arc runner all the way to the back of the arc chute 22. The result is that the arc heat is dissipated evenly, not only over the surfaces of the plates 30, as previously stated, but over the entire vertical height of the arc chute 22, to thereby bring all of the plates 22, and not merely a portion thereof, into play. Consequently, all of the plates 30 are used, instead of only the bottom few plates 30. Also the throat and front of the arc chute 22 shows very little wear and tear at these points.

It will be observed that the distance X across the restricted part of the non-gas-evolving arc shields 37, as shown in Fig. 2, is less than the distance M between the legs 69 of the plates 30 which abut the sides 72 of the shields 37, as shown in Fig. 2. Consequently, the arc 65 will be directed by the shields 37 toward the apices 32 and not against the sides 73 of the plates 30, as indicated in Fig. 5. The arc 65 will, therefore, be rapidly directed toward the back of the arc chute 22, instead of being permitted to contact the inner side edges 73 of the legs 69 of the plates 30.

Moreover, the asbestos plates 37 lend rigidity to the side plates 23, 24 and cause the arc 65 to be formed at a place where no gases will be formed, which gases might cause back pressure preventing motion of the arc into the arc chute 22. Furthermore, since the asbestos plates 37 are formed of non-conducting material, the arc 65 is prevented from attaching thereto at points adjacent to the contacts. The result is that the moving terminal end of the arc 65 moves to the extremity of the arc horn 71, thus utilizing the full heat capacity of the arc chute 22.

Figure 11:
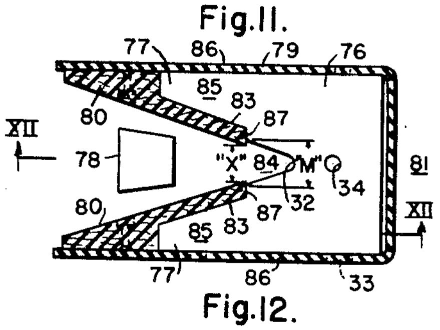
Fig. 11 illustrates a modified type of arc chute which does not require a blowout coil.
Figure 12:
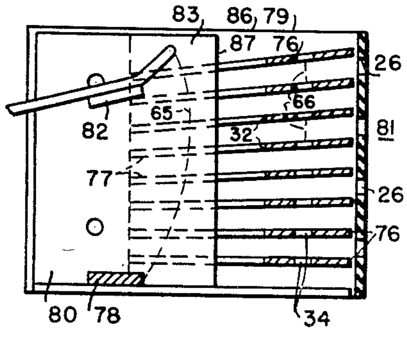
Fig. 12 is a vertical sectional view taken along the line XII—XII of Fig. 11, looking in the direction of the arrows.

Figs. 11 and 12 indicate a modified form of the arc chute which may be utilized when no blowout coils 15, 16 are present. As noted in these figures, the modified plates 76 have leg portions 77 which extend immediately adjacent the contact structure. The position of the stationary contact 78 is somewhat diagrammatically represented, it being desired merely to show the location of the stationary contact 78 with respect to the legs 77 of the magnetic plates 76. Again, an arc deflecting aperture 34 is formed in each magnetic plate 76, and a fiber wrapper 79, having staggered vents 26 stamped therein, is utilized. The asbestos shields 80 are again riveted to the wrapper 79, and again the plates 76 have lug portions 33, which extend through suitably formed apertures in the fiber wrapper 79 and are swaged over across their outer ends.

The operation of the modified type of arc chute 81 will now be explained. Upon upward separating movement of the movable contact 82 from the stationary contact 78, the arc 65 established therebetween has the magnetic field surrounding it distorted by the presence of the plurality of spaced magnetic plates 76. The result upon the arc 65 is that it is forced toward the right, past the extensions 83 of the arc barriers 80, and through the relatively restricted opening 84 toward the apices 32 of the plates 76. The function of the arc deflecting apertures 34 and of the staggered vent opening 26 is the same as heretofore described. In other words, Figs. 11 and 12 show a modification of the arc chute 22, particularly adapting it to the situation in which no series blowout coils 15, 16 are employed, and the magnetic plates 76 must be solely relied upon to accelerate arc movement into the arc chute 81.

It is to be observed that any fiber gas, or any gas, which is formed by movement of the arcs 66 between the several plates 76, is prevented from shooting back toward the contacts 78, 82 by the relatively restricted opening 84. Moreover, there is provided, as shown in Fig. 11, two laterally disposed gas reservoir spaces 85, disposed between the extensions 83 of the arc barriers 80 and the side wall portions 86 of the fiber wrapper 79.

Again, in Figs. 11 and 12, it will be noted that the distance X between the restricted ends of the extensions 83 of the arc barriers 80 is less than the distance M between the legs 77 of the plates 76 at the place where they abut the extensions 83, as at point 87.

Figure 8:
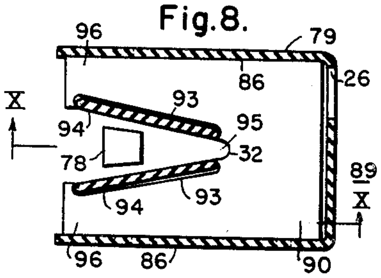
Fig. 8 is a modified type of arc chute employing some of the principles of my invention.
Figure 9:
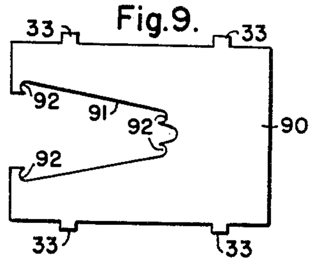
Fig. 9 is a plan view of one of the conducting arc-extinguishing plates of the arc-extinguishing device of Fig. 8.
Figure 10:
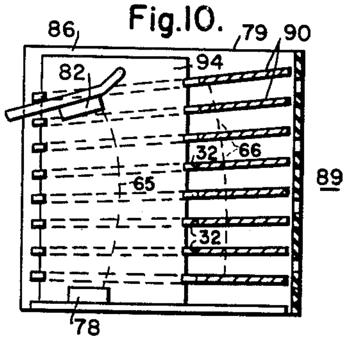
Fig. 10 is a vertical sectional view taken along the line X—X of Fig. 8.

Figs. 8–10 illustrate a further embodiment of my invention. In the modified type of arc chute 89, the magnetic plates 90 have a configuration more clearly shown in Fig. 9 of the drawings. Again, slots 91 are employed but it will be observed that each slot is formed with four notches 92, so that upon alignment of the several spaced plates 90, the notches 92 will form a pair of slot openings 93, more clearly shown in Fig. 8, which will serve to receive a pair of non-gas-evolving or refractory insulating barrier plates 94. The fiber wrapper 79 may be similar to that previously described in connection with Figs. 11 and 12, and again the staggered openings 26 may be utilized. The contact structure 78, 82 may be that as heretofore described in connection with Figs. 11 and 12.

The operation of the modified type of arc chute 89 of Figs. 8–10 is essentially the same as that heretofore described, the established arc 65 of Fig. 10 having the magnetic field thereabout distorted by the presence of the magnetic plates 90 and moving past the arc shields 94, and through the restricted opening at 95 to the apices 32 of the several plates 90, where it is split up into a plurality of serially related arc portions 66, as shown in Fig. 10 of the drawings.

Any gas which is formed within the conducting plate structure is prevented by the restricted opening at 95 from invading the contact space, it also being noted that there are provided two vent passages 96 between the arc shields 94 and the side wall portions 86 of the fiber wrapper 79.

Figure 30:
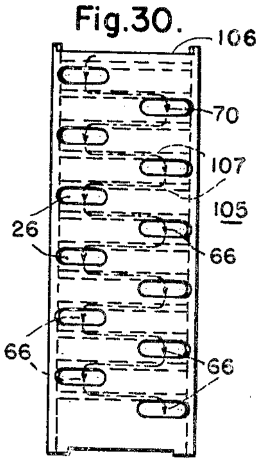
Fig. 30 is an end elevational view of the modified type of arc chute set out in Figs. 26 and 27.
Figure 31:
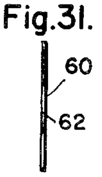
Figs. 31 and 32 illustrate end and plan views, respectively, of an insulating member utilized in my improved arc-extinguishing device.

As mentioned previously, the arc movement of the arcs 66 across the plates will be that as indicated by the arrows 70 of Fig. 30, thereby dissipating the arc heat over the entire surfaces of the plates 90.

The foregoing construction concentrates the magnetic field produced in the plates 90 by the arc 65, in the region of the contacts 78, 82, so that the arc 65 is moved through the restricted opening 95 and onto the spaced magnetic plates 90. The modified type of arc chute 89 provides an efficient cooling and squeezing medium for partly deionizing the arc 65 before entry into the arc chute. The cool asbestos walls 94 absorb heat without emitting ions, as is the case with metal, and consequently there is no metal present at the throat portion to which the arc 65 tends to hang on.

The vents 26 at the back of the arc chute 89 serve to vent the arc gases, but if any pressure is built up in the arc chute 89 very little gas will shoot back out through the throat 95, because this opening is small, and the pressure can dissipate itself in the vent passages 96 formed between the fiber sides and the asbestos shields 94. Most of the gas, therefore, will be kept away from the contact area, and this is a desirable feature required for good arc interruption.

Figure 13:
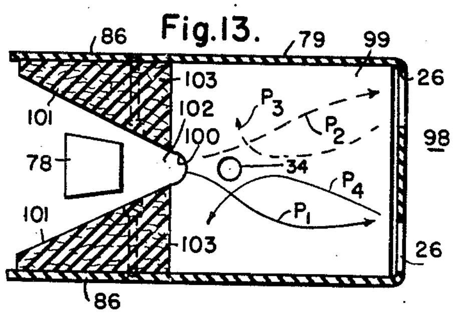
Fig. 13 is a still further modified type of arc chute incorporating certain principles of my invention.

Fig. 13 illustrates a further modified type of arc chute, generally designated by the reference character 98, and particularly adapted to be used with a blowout coil, not shown. The blowout coil may, of course, assume the form as set out in Figs. 15 and 16 of the drawings.

It will be observed that the plates 99, which may be of non-magnetic material, such as copper, have no slot provided therein. There is merely provided a small notch 100 and an arc deflecting aperture 34. Asbestos arc shields 101 are riveted to the side walls 86 of the fiber wrapper 79, and form a restricted opening 102, through which the arc must pass before engaging the plates 99. Thus, the V slot is formed totally by the asbestos, or non-gas-evolving side shields 101. With such a construction the arc 65 will enter at the throat 102 and travel back into the arc chute 98 upon the spaced conducting plates 99, until the hole 34 is reached. This hole 34 is of small diameter and placed in the direct path of the arc.

The arc portions 66 will be deflected here and take the paths, such as $P_1$ and $P_2$ in travelling to the back of the arc chute 98. The gases escape through the vents 26 at the back of the arc chute 98, but if this gas cannot escape fast enough, it will build up pressure and tend to shoot back toward the contacts. However, very little of this gas can reach the contacts, because the opening at 102 is small, and since the asbestos shields 101 have solid sides all the way down at 103. Consequently, whatever gas does invade the contact area must pass through the restricting opening at 102. Moreover, if the gases tend to drag the arcs 66 back along with them, the arcs 66 will be prevented from leaving the arc chute 98 by the several holes 34, as shown by the paths $P_3$ and $P_4$. This construction, therefore, very effectively shields the contacts from "back shooting" of gases or arcs. Models of this arc chute 98 were tested, and markings left upon the arc chute by the arc traces confirm the description of the arc movements, as set out above.

Figures 26, 27:
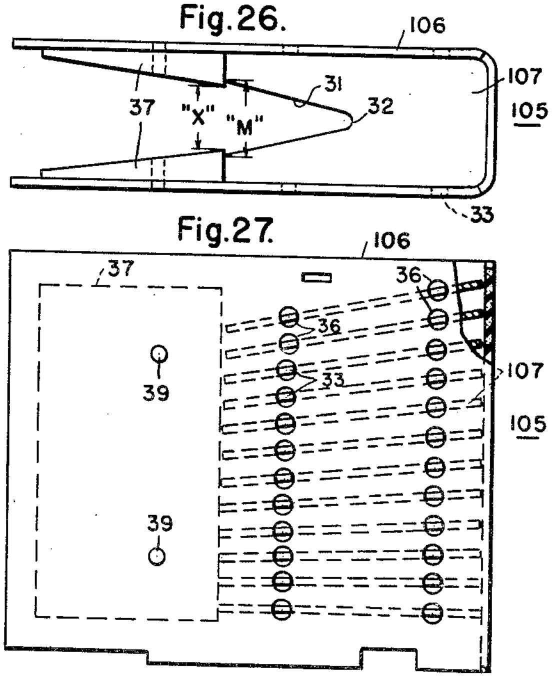
Fig. 26 illustrates a top plan view of a modified type of arc chute construction utilizing certain principles of my invention.
Fig. 27 illustrates a side elevational view of the modified type of arc chute set out in Fig. 26.

Figs. 26, 27 and 30 indicate a modified type of arc chute 105 which may be used in place of the arc chute 22 in the circuit interrupter of Fig. 1. As noted in Figs. 26, 27 and 30, an insulating fiber wrapper 106 has the arc barrier plates 37 riveted thereto, and apertures 36 are provided in the fiber wrapper 106 to accommodate mounting lugs 33 of the conducting plates 107.

These conducting plates 107 are similar to the plates 30 but omit the deflecting hole 34. The fiber wrapper 106 has the staggered vent openings 26 provided therein of less vertical height than the vertical height between the spaced conducting plates 107. The operation and the function of the several component parts of the modified arc chute 105 are substantially the same as described in Figs. 1–7 of the drawings, but the gas-evolving strip 29 is omitted, thereby making the resulting structure more economical to manufacture.

Figs. 26, 27 and 30, therefore, indicate how the principles of my invention may be economically adapted for large scale manufacturing. The asbestos arc barrier plates 37 again guide the arc 65 into the slots 31 of the plates 107, and the subdivided arc portions 66 in moving across the conducting plates 107 are staggered across the conducting plate structure, as indicated by the arrows 70 in Fig. 30. Extinction of the arc portions 66 soon follows, and the circuit is interrupted.

Certain features of the foregoing constructions are set forth and claimed in my copending patent application filed February 16, 1950, Serial No. 144,461, issued August 24, 1954, as U. S. Patent 2,687,462, and application filed April 8, 1950, Serial No. 154,813, issued September 29, 1953, as U. S. Patent 2,654,012, and assigned to the assignee of the instant application.

The foregoing interrupting structures indicate how I have provided an improved circuit interrupter controlling the arc movement across spaced conducting plates, and how I have controlled the passage of the arc gases. Certain features are adapted for use with or without a blowout coil, and where economical manufacturing is at a considerable premium the structures set forth in Figs. 26, 27 and 30 may be employed. As set out above, the position and configuration of the arc shields 37, 94, 80 and 101 improve circuit interruption, and the use of an arc deflecting aperture 34, in particular applications, is desirable in assisting the staggered vent openings 26 in effecting staggered arc movement of the arc portions 66 across the conducting plates.

The position and height of the vent openings 26 in relation to the vertical height between the spaced conducting plates is important in controlling the movement of, and effecting the deionization of, the arc portions 66, as indicated in Fig. 14 of the drawings. Thus, the interrupter of my invention is more effective, and brings about more rapid arc extinction in an improved manner than has been obtained heretofore with conventional spaced conducting plate structures.

Although I have shown and described specific structures, it is to be clearly understood that the same were merely for the purpose of illustration, and that changes and modifications may readily be made therein by those skilled in the art without departing from the spirit and scope of the appended claims.

I claim as my invention:

1. A circuit interrupter including a pair of separable contacts to establish an arc, an arc chute including a plurality of spaced conducting plates, an insulating casing for the arc chute substantially abutting the exhaust ends of the plates and having a plurality of spaced staggered venting slots, each of a plurality of venting slots being disposed between an adjacent pair of plates, the width of the venting slots being less than the spacing between the several plates, and a gas-evolving strip member disposed intermediate the ends of the arc chute.

2. A circuit interrupter including a pair of separable contacts to establish an arc, an arc chute including a plurality of spaced conducting plates, an insulating casing for the arc chute, substantially abutting the exhaust ends of the plates and having a plurality of spaced staggered venting slots, each of a plurality of venting slots being disposed between an adjacent pair of plates, the width of the venting slots being less than the spacing between the several plates, and a pair of converging non-gas-evolving arc barrier members disposed adjacent the contacts to prevent the evolution of gas when the arc is initially established.

3. A circuit interrupter including a pair of separable contacts to establish an arc, an arc chute including a plurality of spaced conducting plates, an insulating casing for the arc chute substantially abutting the exhaust ends of the plates and having a plurality of spaced staggered venting slots, each of a plurality of venting slots being disposed between an adjacent pair of plates, the width of the venting slots being less than the spacing between the several plates, and an arc deflecting aperture in at least some of the conducting plates to bias the arc laterally in the direction of the vents.

4. Circuit interrupting means including contact means for establishing an arc, a U-shaped insulating wrapper, a plurality of spaced conducting slotted plates supported within the U-shaped insulating wrapper and having their exhaust ends immediately adjacent the wrapper, the arc moving into and between the plates to become subdivided thereby, a plurality of spaced staggered venting slots at the bight portion of the wrapper disposed between the plates and having less width than the spacing between the plates, and a pair of converging non-gas-evolving arc barrier members disposed adjacent the contact means and forming a throat portion leading into the spaced plates.

5. Circuit interrupting means including contact means for establishing an arc, a U-shaped insulating wrapper, a plurality of spaced conducting slotted plates supported within the U-shaped insulating wrapper and having their exhaust ends immediately adjacent the wrapper, the arc moving into and between the plates to become subdivided thereby, a plurality of spaced staggered venting slots at the bight portion of the wrapper disposed between the plates and having less width than the spacing between the plates, and at least some of the conducting plates having an arc deflecting aperture disposed therein.

6. A circuit interrupter including a pair of separable contacts to establish an arc, an arc chute including a plurality of spaced conducting plates, an insulating casing for the arc chute substantially abutting the exhaust ends of the plates and having a plurality of spaced staggered venting slots, each of a plurality of venting slots being disposed between an adjacent pair of plates, the width of the venting slots being less than the spacing between the several plates, the plates having two sets of aligned notches provided therein, and a pair of converging insulating plates disposed within the aligned notches to form a throat portion leading into the plates.

7. A circuit interrupter including a pair of separable contacts to establish an arc, an arc chute including a plurality of spaced conducting plates, an insulating casing for the arc chute substantially abutting the exhaust ends of the plates and having a plurality of spaced staggered venting slots, each of a plurality of venting slots being disposed between an adjacent pair of plates, the width of the venting slots being less than the spacing between the several plates, the plates being slotted, a pair of non-gas-evolving arc barriers disposed adjacent the contacts, and each arc barrier having an extension lining the inner sides of the legs of the plates.

8. A circuit interrupter including a pair of separable contacts to establish an arc, an arc chute including a plurality of spaced conducting slotted plates, an insulating casing for the arc chute substantially abutting the exhaust ends of the plates and having a plurality of spaced staggered venting slots, each of a plurality of venting slots being disposed between an adjacent pair of plates, the width of the venting slots being less than the spacing between the several plates, a pair of converging non-gas-evolving arc barrier members disposed adjacent the contacts forming a throat portion leading to the plates, and the lateral spacing of the throat portion being less than the lateral spacing between the legs of the slotted plates.

9. A circuit interrupter including means for establishing an arc, an arc chute for extinguishing the arc including a plurality of spaced conducting slotted plates having leg portions, a pair of cooperating converging insulating arc barrier members forming a passage leading into the plate structure, and the width of the throat portion of the barrier members being less than the width between the legs of the plates.

References Cited in the file of this patent

UNITED STATES PATENTS

| | | |
|---|---|---|
| 1,868,442 | Corbett | July 19, 1932 |
| 1,896,764 | Brainard | Feb. 7, 1933 |
| 2,140,360 | Jennings | Dec. 13, 1938 |
| 2,147,419 | Baker | Feb. 14, 1939 |
| 2,147,430 | Ellis et al. | Feb. 14, 1939 |
| 2,160,681 | Sandin | May 30, 1939 |
| 2,244,061 | Graves | June 3, 1941 |
| 2,276,859 | Nau | Mar. 17, 1942 |